United States Patent [19]
Frese

[11] Patent Number: 5,107,130
[45] Date of Patent: Apr. 21, 1992

[54] SENSOR ASSEMBLY FOR SENSING PRINTED MARKS ON A PRINT MEDIUM

[75] Inventor: Dale C. Frese, San Jose, Calif.

[73] Assignee: Synergy Computer Graphics Corporation, Sunnyvale, Calif.

[21] Appl. No.: 455,642

[22] Filed: Dec. 22, 1989

[51] Int. Cl.$^5$ .................... G01B 11/00; G01N 21/47
[52] U.S. Cl. ............................ 250/556; 250/548; 250/561; 250/237 G
[58] Field of Search ............ 356/446, 448, 429; 250/548, 555, 556, 557, 566, 570, 231.16, 237 G

[56] References Cited

U.S. PATENT DOCUMENTS

| | | | |
|---|---|---|---|
| 3,557,380 | 1/1971 | Matthews | 250/548 |
| 3,894,216 | 7/1975 | Bottles | 250/566 |
| 4,731,542 | 5/1988 | Doggett | 250/548 |
| 4,808,832 | 2/1989 | Doggett | 365/203 |
| 4,843,237 | 6/1989 | Michel | 250/237 G |

Primary Examiner—F. L. Evans
Attorney, Agent, or Firm—Skjerven, Morrill, MacPherson, Franklin & Friel

[57] ABSTRACT

A sensor assembly is provided in which a balanced pair of sensors is provided by abutting two optical devices each having a light emitting diode of infrared emitting diode type (IRED) and a photosensitive transistor. By using only one IRED which is located between the photo-sensitive transistors, a substantially identical image of an object placed above the IRED is provided to simultaneously to each of the phototransistors. The sensors mounted on a printed circuit board are also aligned to windows on a surface of the sensor assembly automatically by providing projections, preferably cylindrical, on the inside walls of the sensory assembly and complementary recesses on the printed circuit board. Signals are transmitted to a multiplicity of printed circuit boards simultaneously by threading conductors through holes situated at predefined locations on each printed circuit board.

6 Claims, 9 Drawing Sheets

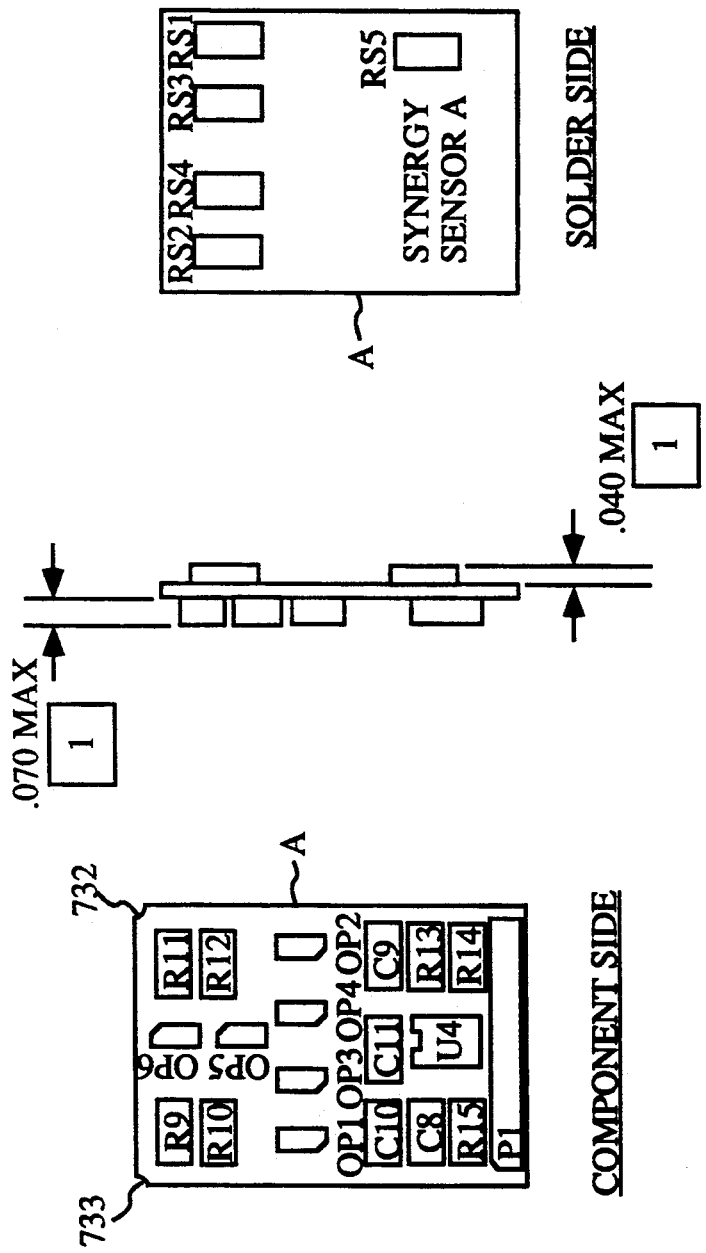

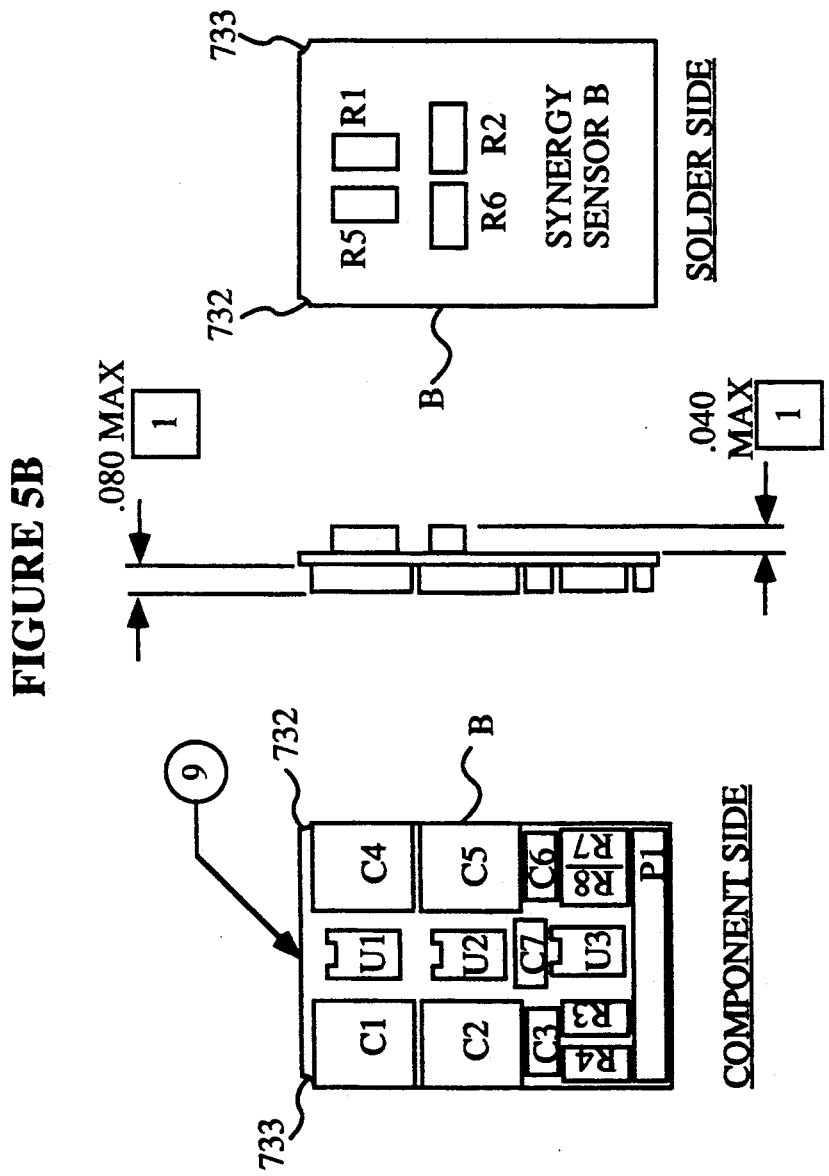

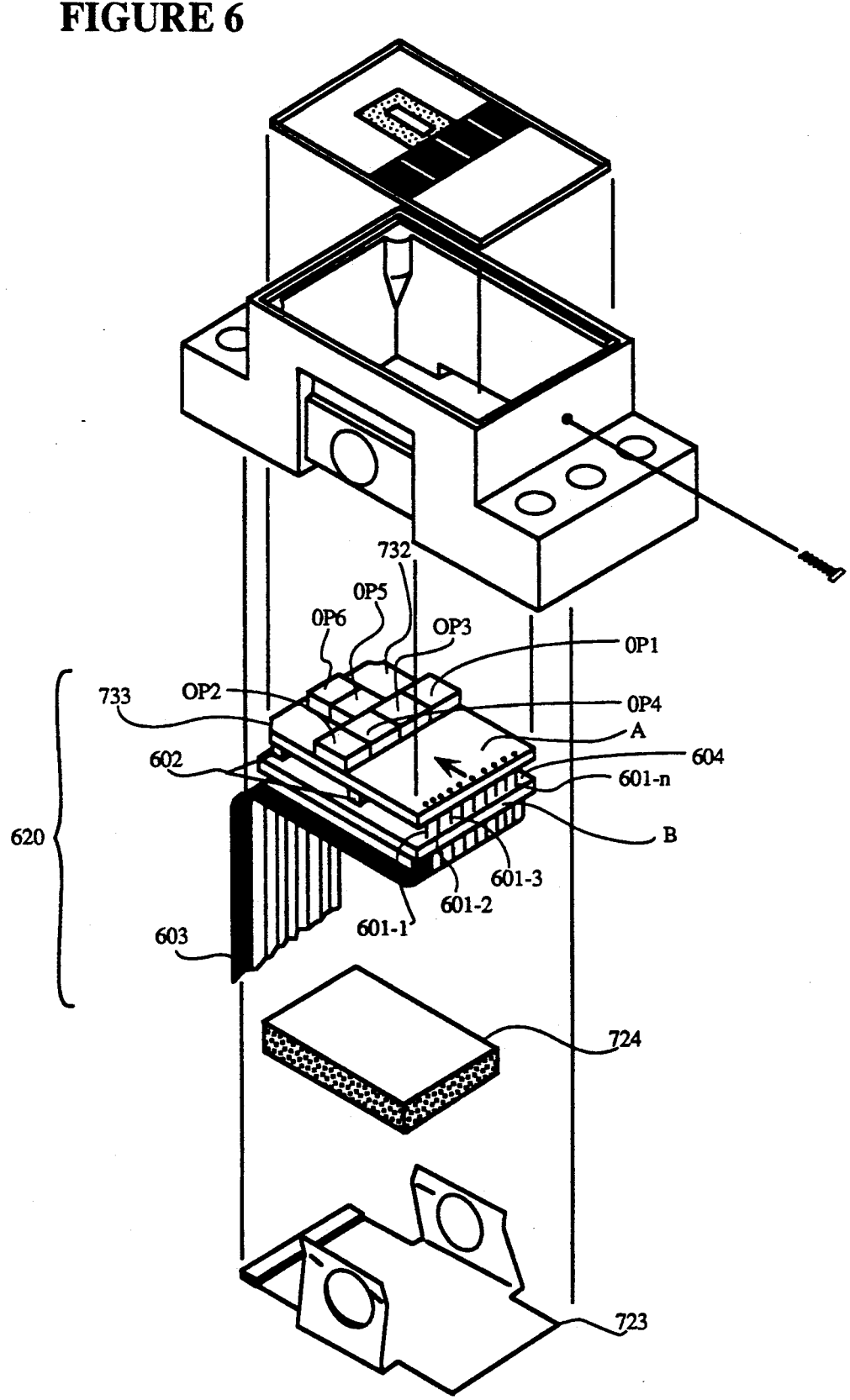

SENSOR ASSEMBLY FOR SENSING PRINTED MARKS ON A PRINT MEDIUM

BACKGROUND OF THE INVENTION

1. Field of the Invention

This invention relates to the accurate alignment and assembly of sensors and signal processing circuits in a sensor assembly and, more particularly, to a sensor assembly for use with an electronic printer to control the start of plot and print lines.

2. Description of the Prior Art

Marks printed on a print medium have been used to direct the start of plot in a print process where more than one print head is required to provide the printed image. Because of the stringent requirement of high resolution printing, in which an error of 0.025", for example, is not tolerated, the correct positioning and alignment of the print medium with the print heads and of the print heads with the sensors which control start of plot and the print lines are particularly important.

In one embodiment, the alignment of the print medium with respect to the print heads is accomplished by sensing both a printed tracking line which contains a set of special marks called start-of-plot marks (SOP marks), and a continuous line of light and dark bands called "tick marks." One such system is described in U.S. Pat. No. 5,047,631 to D. Frese, entitled "Self-Referencing Start of Plot System and Method," issued Sep. 10, 1991; U.S. Pat. No. 4,047,631 is hereby incorporated by reference in its entirety.

In the prior art, the tracking line is sensed by a single lens optical system 42 as shown in FIGS. 4A and 4B. In FIG. 4A, the print medium 128 containing tick mark track 720 and tracking line 110, which also includes SOP mark 211, moves in the direction of 129 over optical system in sensor assembly 42, with the tracking line 110 directly above window 42e of optical system 42. Print medium 128 is illuminated by two infrared emitting diodes (IRED) 42c and 42c' (FIG. 4B) located off axis from the tracking line. An optical element 42d is required to project the image of the tracking line 110, as illuminated by IRED 42c and 42c', onto two photo-voltaic cells 42a and 42b which sense the location of the tracking line 110 and the start of plot mark 211. While this system worked, it required a precisely aligned optical element 42d and highly accurate control over the distance between the print medium and the locations of each of the photovoltaic cell 42a and 42b. The assembly cost is therefore high, and the resulting sensor assembly is also relatively large to be undesirable in a printer where space is a premium.

Also in the prior art, the sensors must be accurately aligned to "windows"—precisely defined areas such as 42e on the sensor assembly through which light is transmitted to the sensors. Circuit boards containing the sensors had to be individually and accurately positioned with the sensor assembly during the assembly process to achieve the necessary alignment of the windows to the sensors. This is an expensive step in the assembly process.

Another problem relates to the packing of the signal processing circuits into the sensor assembly. Since the sensor assembly must be made as compact as possible, the circuits for processing the sensor responses must be split up and separately mounted on more than one circuit board, requiring routing and interboard wiring to transmit signals and power. Signals and power may be routed by providing individual jumpers or connections. However, providing individual jumpers to connect terminals of the circuit boards is labor intensive and using connectors to connect circuit boards is space inefficient as well as expensive.

SUMMARY OF THE INVENTION

According to the present invention, a self-aligned light source and sensor combination is achieved by abutting two optical devices side by side. Each optical device comprises a photo-sensitive transistor and a light source contained in a substantially rectangular package in which the light source is located in one half of the package and the photo-sensitive transistor is located in the other half. By abutting two such optical device such that one of the light sources is situated between the two photo-sensitive transistors and the other light source is either inactivated or blocked by the package, the reflected images of an object located substantially directly above the one light source will be substantially of the same intensity and at the same angle at the two photo-sensitive transistors, without the use of an optical focusing element.

As part of this invention, the two photo-sensitive transistors (sometimes implemented using photodarlington transistors) are positioned on a printed circuit board which is self aligned in an assembly housing by alignment indicia (such as quarter circle notches) at selected points on the edges of the PC board.

Thus, according to the present invention, as shown in FIG. 6, a self-aligned sensor and sensor assembly combination is provided by forming quarter-circular cylindrical projections 730 and 731 at the two neighboring corners of a rectangular cavity 726 inside the sensor assembly 700. Complementary quarter-circular recesses 732 and 733 are formed on a circuit board on which the sensors are mounted, such that when the circuit board is pushed against the wall of the rectangular cavity 726 during assembly, the cylindrical projections 730 and 731 will fit snugly into the quarter-circular recesses 732 and 733 of the circuit board, resulting that the sensors are automatically aligned to the predefined window locations of the sensor assembly 700. The sensors are mounted on holes formed at the same time on the circuit board as the holes which become the quarter-circular recesses 732 and 733 at the end of the circuit board fabrication process. The required accuracy of placement of sensors with respect to the locations of the quarter-circular recesses is easier to attain then precise machining of the printed circuit board needed in the prior art.

Also according to the present invention, as shown in FIG. 6, signals are transmitted to a multiple number of circuit boards (two shown) placed in close proximity and to external circuits by providing holes in predefined locations 601-1, 601-2 . . . 601-n on each circuit board such that a conductor carrying a signal may be threaded through the corresponding holes of all circuit boards in one assembly step, without the use of a connector or providing individual connections one at a time, thereby providing a conductive path transmitting the signal simultaneously to all circuit boards. The conductor may be the wires of a ribbon cable stripped of insulation.

BRIEF DESCRIPTION OF THE DRAWINGS

FIG. 5A shcws an embodiment of the present invention in which the quadrature sensors OP1 through OP4 and SOP sensors OP5 and OP6 are mounted on a printed circuit board having quarter-circular recesses 732 and 733 for properly aligning the sensor assembly 700 to the printed circuit board.

FIG. 5B shows an embodiment of the present invention in which the quadrature current to voltage converters, peak detectors and interface line drivers are mounted on a printed circuit board B having the quarter-circular recesses 732 and 733 for proper aligning the sensor assembly 700 to the printed circuit board.

FIG. 6 shows an exploded view of a sensor assembly according to the present invention.

DETAILED DESCRIPTION

An embodiment of the present invention implements a sensor assembly containing two sets of sensors: quadrature sensors OP1 to OP4 and SOP sensors OP5 and OP6, for use to control start of plot in a printer. The operation of the sensors are described in the above-mentioned U.S. Pat. No. 5,047,631 to Dale Frese, incorporated by reference above.

Figure 3A:
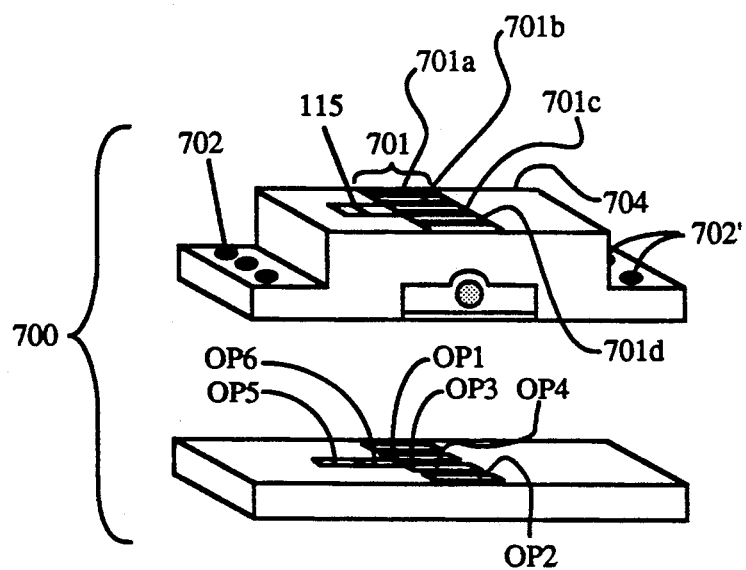
FIG. 3A shows a sensor assembly 700 containing both quadrature sensors OP1 through OP4 and SOP sensors OP5 and OP6 in an embodiment of the present invention used to sense printed marks and a tracking line on a print medium.

According to the present invention, a sensor assembly is provided which includes the quadrature sensors OP1-OP4 and SOP sensors OP5 and OP6, and aligned to printed images for control purposes. The sensor assembly 700 is illustrated in FIG. 3A. On one surface of sensor assembly 700 is provided a rectangular transparent window 701 on which four sets of rulings or gratings 701a, 701b, 701c and 701d, called "Ronchi rulings," are engraved. Next to rectangular window 701 is a small transparent window 115. The four quadrature sensors OP1, OP3, OP4, and OP2 are located respectively inside the sensor assembly 700 directly behind rulings 701a, 701b, 701c and 701d. Directly behind window 115 inside the sensor assembly 700 are the SOP sensors OP5 and OP6.

Figure 3B:
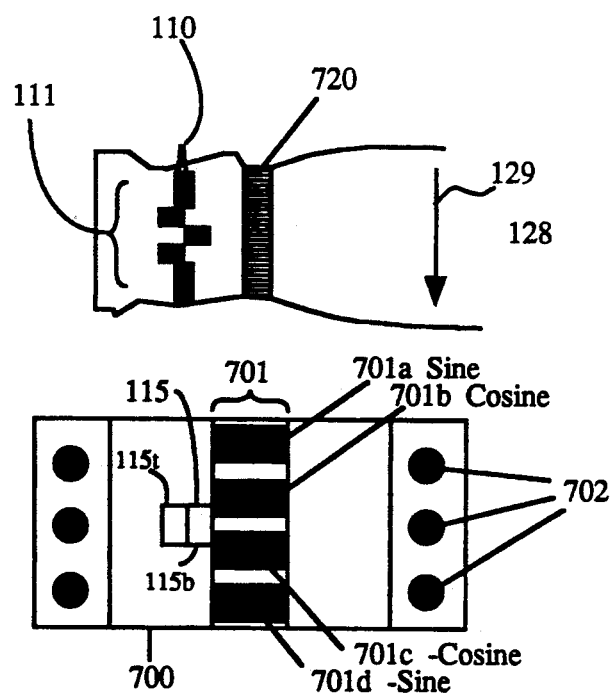
FIG. 3B shows the sensor assembly 700, shown in FIG. 3A, in relation to the printed tick marks 700 and tracking line 110 on the printed medium 128.
Figure 3C:
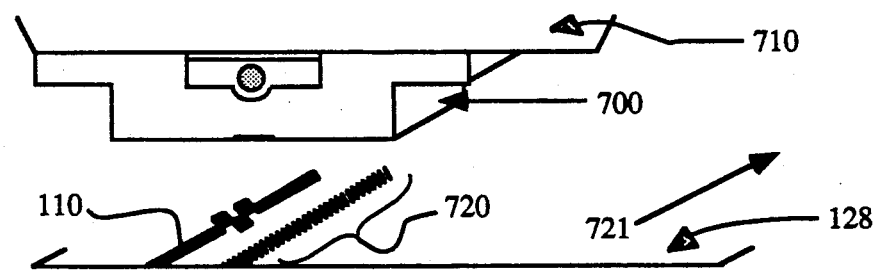
FIG. 3C shows an isometric view of sensor assembly 700 positioned for sensing track line 110, including SOP mark 111, and tick mark track 720.

FIG. 3B shows the relationship of the sensor assembly 700 to the print medium 128 on which is printed a continuous tracking line 110, interrupted by a printed start of plot mark 111. And also printed on print medium 128 next to tracking line 110 is a continuous track 720 of alternately dark and light rectangular bands called the "tick marks" 720. The print medium 128 travels in the direction indicated by the arrow 129. FIG. 3C is an isometric view of sensor assembly 700, mounted on a frame of a printer (not shown), positioned so as to sense tracking line 110, including SOP mark 111. The printed side of the print medium 128 contacts the surface of the sensor assembly 700 where the windows 701 and 115 are situated. FIG. 3B shows the continuous tracking line 110, interrupted by the start of plot mark 111, passing over window 115, which has two regions 115t and 115b defined, and also continuous tick mark track 720 passing over window 701.

Figure 1A:
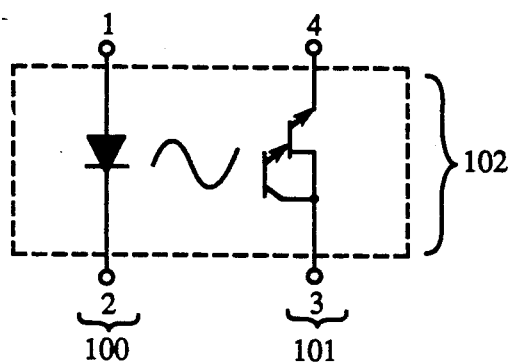
FIG. 1A shows a schematic diagram of an optical device containing a light emitting diode 100 and a light sensitive transistor 101.
Figure 1B:
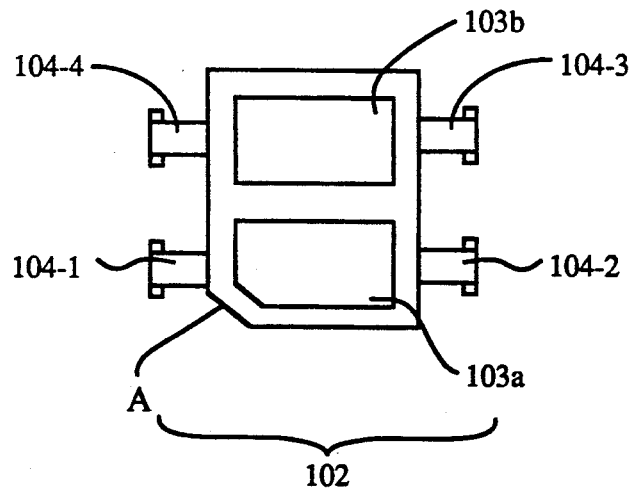
FIG. 1B shows a package of the optical device shown in FIG. 1A, with windows 103a and 103b in the top surface transparent to the light emitted by the light emitting diode 100 of the optical device.
Figure 2A:
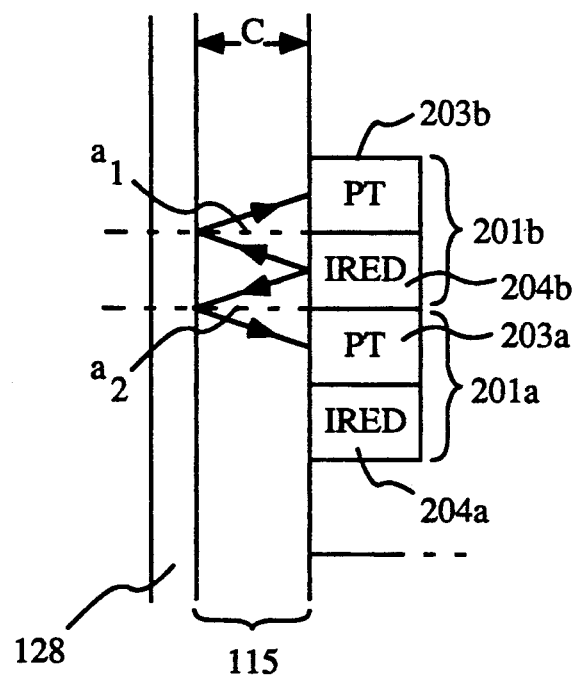
FIG. 2A. shows a side view of an embodiment of the present invention as a pair of sensors 201a and 201b sensing printed marks on a print medium 128, using two of the optical devices shown in FIG. 1B but with the light emitting diode in sensor 201a blocked or made inoperative so that no light from this light emitting diode reaches print medium 128.

The quadrature and SOP sensors OP1 through OP6 contained in assembly 700 are each preferably implemented using the optical device MTRS9070 from Marktech International, Corporation but any other equivalent device would also. be appropriate. An optical device, such as that used to implement each of the sensors OP1 and OP6, is shown schematically in FIG. 1A, and consists of a light emitting diode 100 of the infrared emitting diode (IRED) type and photodarlington transistor 101, often called phototransistor, in the same housing 102. While infrared is preferred, light emitting diodes of other wavelengths may also be used. FIG. 1B shows a plan view of the housing 102. While most of the housing 102 is opaque to infrared and visible electromagnetic radiation, two separate transparent windows 103a and 103b are provided in housing 102; window 103a is provided for the IRED 100 and window 103b for the photodarlington transistor 102. Four leads labeled 104-1 through 104-4 are provided for connecting to IRED 100 and photodarlington transistor 101. These windows 103a and 103b are located on the top surface of the housing 102 such that there is no direct optical path between the IRED 100 and the photodarlington transistor 101. Thus, an object placed above housing 102 would be illuminated by the IRED 100 and would reflect part or all of this illumination onto the photodarlington transistor 101. This reflected light would cause an electrical current to flow within the photodarlington transistor 101 and thus the reflected light would be "sensed." FIG. 2A shows one embodiment of the present invention using two of the optical devices 201a and 201b to implement the raster/SOP sensors OP5 and OP6 which detect the position of a start of plot mark and tracking line on a print medium 128. Because the vertical distance of the print medium 138 above the device is one factor determining the overall sensitivity of the device, this distance is controlled in the fabrication of the sensor assembly 700 by using a glass window 115 (FIG. 2A) which is to contact the print medium 128 on one surface, and contact, on the opposite side surface, the top surfaces of the optical devices 201a and 201b. As a result, the thickness of the glass 115 holds the print medium 128 a distance C from the optical devices 201a and 201b, thereby providing an accurate and repeatable method for separating the print medium 128 from the sensors 201a and 201b.

Furthermore, in one embodiment of the quadrature sensors OP1, OP2, OP3 and OP4, the Ronchi rulings are etched into the glass surface 701 in contact with the print medium 128. This arrangement minimizes any distance between the rulings and the print medium 128. Alternatively, these rulings could be formed by engraving, imprinting or any other method suitable for providing the alternatively clear and opaque bands on the glass 701. Since the lines and spaces of the ruling and the "tick" marks are each 0.005 inches wide, a gap of a similar magnitude between the glass surface 701 and the print medium 128 would significantly reduce the amplitude of the signals produced by OP1-OP4. Thus a pressure pad (not shown) is required to force the print medium 128 against this surface of glass 701.

Figure 4A:
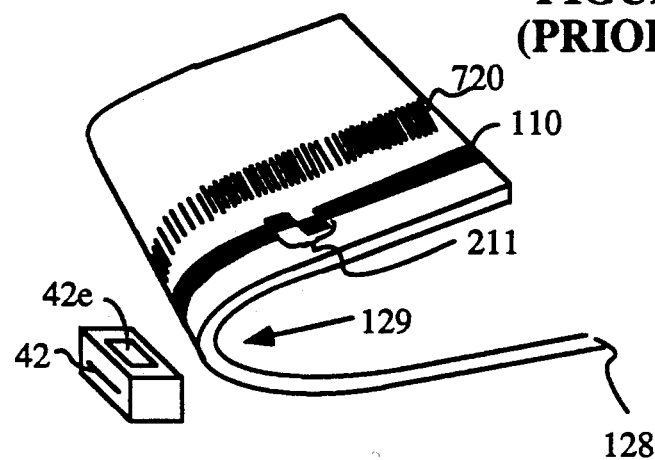
FIG. 4A shows a prior art sensor assembly 42 positioned for sensing tracking line 110 and SOP mark 211 contained in tracking line 110.
Figure 4B:
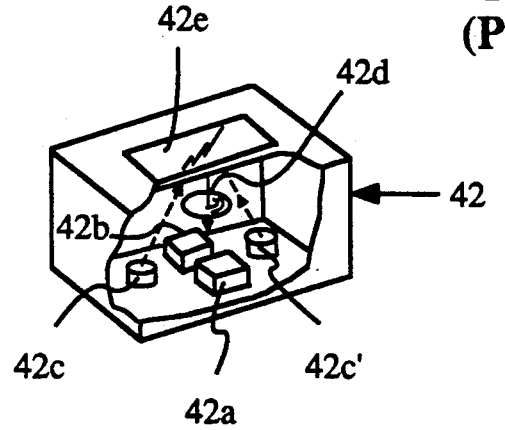
FIG. 4B shows the components of prior art sensor 42 assembly for sensing SOP marks.

The relative arrangement of the raster/SOP sensors OP5 and OP6 is unique in accordance with this invention. Ideally, the sensors OP5 and OP6 should form two square sensing areas placed directly adjacent to each other and aligned perpendicular to the tracking line 110 and parallel to the plane of the tracking line 110. The reflected image of the tracking line 110 would then be incident onto these two square sensing areas. This was accomplished in prior art as shown in FIG. 4B by a single lens optical system contained in sensor assembly 42 which transferred an image of the printed medium 128, which was illuminated off axis by two IREDS 42c and 42c', onto the surface of two closely spaced photovoltaic cells 42a and 42b of proper area. While this prior art system functioned relatively well, it was difficult to manufacture because of the number of variables that had to be controlled in the optical system contained in sensor assembly 42 (for example, the spacing and alignment of cells 42a and 42b, and quality of the lens 42d). Also, the resulting assembly required substantial manual labor to assemble and the resulting assembly was relatively large.

The present invention provides an improved sensing system for sensing tracking line 110 and SOP mark 111 by arranging uniquely two of the optical devices 201a and 201b previously described to sense the position of the tracking line 110 without the use of a lens or lenses. The resulting assembly is cheaper, smaller, lighter and less complex than the prior art structure used for the same purpose. Surprisingly, enough light from the light source is reflected to the surfaces of the two phototransistors 203a and 203b despite the lack of a lens and the closeness of the phototransistors 203a and 203b to the print medium 128 to allow phototransistors 203a and 203b to provide signals indicative of the lateral position of tracking line 110 and the passage of SOP mark 111. In accordance with this invention, the removal of the prior art lens makes it possible to place phototransistors 203a and 203b much closer to the surface containing tracking line 110 than when the lens is present. Indeed, the close placement of the phototransistors 203a and 203b to the print medium 128 makes possible the removal of the lens. The optimum distance of phototransistors 203a and 203b from the print medium 128 to allow sufficient energy from the light source to be reflected from the print medium 128 to phototransistors 203a and 203b is determined by balancing the increase in light intensity (i.e., light energy per unit area, often called light "flux") with decreasing distance from the light source against the decrease in light intensity incident upon the faces of phototransistors 203a and 203b as these phototransistors come closer to the print medium 128. Naturally, as these phototransistors 203a, 203b come closer to the print medium 128 the light's angle of incidence on the faces of phototransistors 203a and 203b approaches 90° and the light flux incident on these faces drops approximately as the cosine of the angle of incidence of the light on these faces.

Figure 2B:
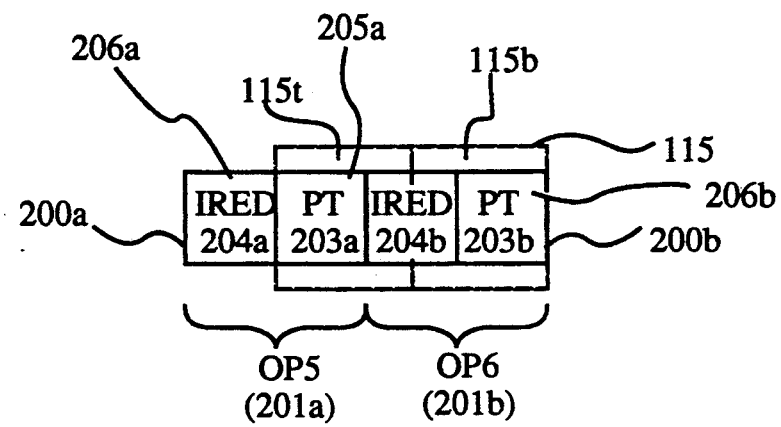
FIG. 2B shows a plan view of the embodiment of the sensor pair 201a and 201b shown in FIG. 2A.

As shown in FIG. 2B, two devices 201a and 201b are placed end-to-end such that the windows 205a, 206a, 205b and 206b, for the photodarlington transistors 203a and 203b and the IREDS 204a and 204b respectively, fall on a line. However, the last IRED 204a in this line is not connected into the circuit and thus is not operative. As will be explained below, by placing IRED 204b symmetrically between the photodarlington 203a and transistor 203b, the same level of reflected illumination is incident and at the same angles of incidence on both photodarlington transistors 203a and 203b.

Optical devices 201a and 201b are then placed in contact with the surface of the glass window 115 on the same side as the quadrature sensors OP1, OP2, OP3 and OP4 abut window 701 (see FIGS. 2B, 3A and 6). The line of windows 205a, 206a, 205b, 206b (FIG. 2B) is perpendicular to the tracking line 110 (FIG. 3B) such that the IRED 204b, located between the two photodarlington transistors 203a and 203b (FIG. 2B) is centered on the tracking line 110 (FIG. 3B). Thus, advantageously as part of this invention, one IRED 204b illuminates both photodarlington transistor 203b in the same optical device 201b and photodarlington transistor 203a in the neighboring device 201a. As will be discussed below, this arrangement provides roughly identically level of image illumination for both photodarlington transistors 203a and 203b.

The distances between each IRED 204b and each of the photodarlington transistors (203a or 203b) are not exactly the same: i.e. photodarlington transistor 203b is 0.063 inches from IRED 204b due to the common housing of optical device 201b, and IRED 204b is 0.071 inch from photodarlington transistor 203a in optical device 201a due to the extra thickness of the material in the walls of housings 200a and 200b. A point of maximum sensitivity exists midway between IRED 204b and photodarlington transistor 203b which is 0.031 inches from the midpoint of either IRED 204b or phototransistor 203b. The other point of maximum sensitivity is 0.035 inches from the midpoint of either IRED 204b or photodarlington transistor 203a. The difference in the distance between IRED 204b to each of these two points of maximum sensitivity is not considered significant. Hence, as shown in FIG. 2A, the angles $a_2$ and $a_1$ at which light originating from IRED 204b, reflected from print medium 128, arrive at photodarlington transistors 203a and 203b are roughly equal. As a result, a variable (the angle of reflection) which affects the operation of sensors OP5 and OP6 working as a balanced pair is substantially eliminated. Since the IRED 204b is centered on the tracking line 110 and since the tracking line 110 width is 0.0625 inches, the edges of the tracking line 110 fall on approximately the centers of maximum sensitivity of the photodarlington transistors 203a and 203b. Furthermore, the areas over which 80% of the responses of the photodarlington transistors 203a and 203b are produced are circles, each circle being centered midway between the corresponding photodarlington transistor 203a or 203b and IRED 204b and having a radius of 0.040 inches. Thus, if unrestricted, the sensing areas of the raster/SOP sensors OP5 and OP6 are made up of two circular areas each of 0.080 inch diameter spaced 0.065 inch apart. The ideal square sensing areas discussed above can be approximately attained by blocking part of the sensing areas, and allowing only light transmission through the appropriately sized window 115 described below.

Figure 2C:
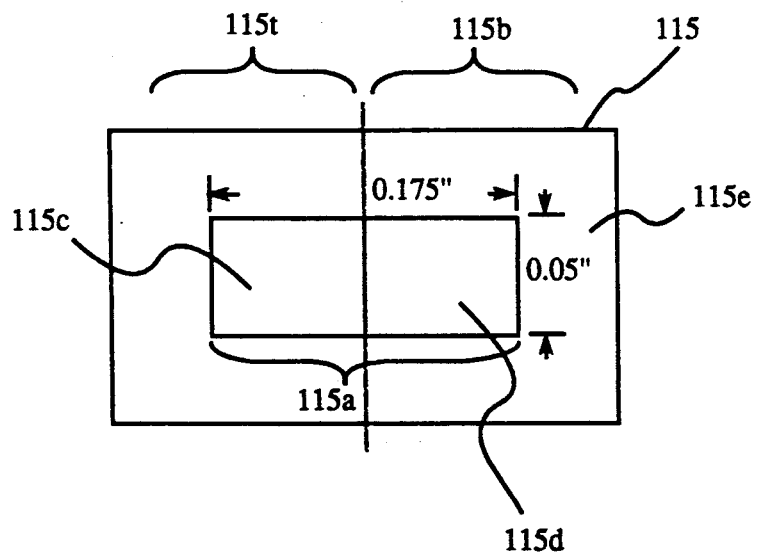
FIG. 2C shows a window structure 115t, 115b in the sensor housing restricting the field of view of the sensors 201a and 201b shown in FIG. 2B.

FIG. 2C shows the window 115. An aperture 115a is created on the surface of the glass window 115 by etching and filling the etched area 115e with an opaque material on the surface of the glass that is in contact with the print medium 128. The etched area 115e forms a border around a clear area 115a formed by regions 115c and 115d directly above the Raster/SOP sensors OP5 and OP6. The border 115e extends beyond the regions of sensitivity of the photodarlington transistors 203a and 203b, such that sensors OP5 and OP6 will only respond to light reflected within the clear area 115a formed by regions 115c and 115d. This clear area 115a thus defines the rectangular sensing area to be 0.050 inch along the axis of the tracking line 110 and 0.175 inches perpendicular to the axis of the tracking line 110. Over this sensing area 115a, the illumination provided by IRED 204b is substantially uniform. The sensing area 115a is designed to have a length along the axis of the tracking line 110 of five tick marks, which is a tradeoff between noise minimization and vulnerability to printing artifacts. If the sensing area 115a is chosen to be too wide, the output signals of OP5 and OP6 becomes less sensitive to changes in the printed image (e.g., arrival of SOP mark 118) on tracking 110, so that noise in the environment will have a greater impact on the output of sensors OP5 and OP6. On the other hand, if the sensing area 115a is made too narrow, a printing artifact, such as a missing print line, will also have a large impact on the output signals of sensors OP5 and OP6. The sensing area 115a is also designed to isolate the light of IRED 204b from light of the IREDs in the quadrature sensors OP1-OP4. Hence, the ideal square sensing areas are approximately attained in OP5 and OP6.

The spacing and location of the etched Ronchi rulings 701a, 701b, 701c and 701d in window 701 on the glass is made to match the spacing of the "tick" mark area 701. Similarly, the raster/SOP window 115 is made such that tracking line 110 on the print medium 128 is positioned roughly covering the middle portion of the window 115, leaving one half of window regions 115c and 115d exposed to the blank print medium 128. The locations of quadrature sensors OP1 to OP4 and raster/SOP sensors OP5 and OP6 are determined by the locations of their respective mounting holes on a printed circuit board. The mounting holes used provide that the heights of the devices above the board are determined by the bodies of the packages of the optical devices in these sensors and not by their leads. Furthermore, the rest of the sensor circuitry is implemented using surface mount components such that the tallest components are the optical devices implementing the sensors. This is important since the glass window 115 (FIGS. 2A and 6) is brought in contact with the optical devices of sensors OP5 and OP6 during final assembly, and hence sets the object to sensor distance. Since the space available within a printer does not allow all of the circuitry associated with the sensor assembly 700 to be contained on one printed circuit board, the functions of the sensor assembly 700 are broken into two printed circuit boards 'A' and 'B'. FIG. 5A shows both sides of sensor board 'A' including the locations of the quadrature sensors OP1-OP4 and raster/SOP sensors OP5 and OP6 along with allocated locations labeled U4, R10-R15 and C9-C11 where current setting resistors and the current to voltage converters of sensors OP5 and OP6 are to be placed. The second board, sensor board 'B' (FIG. 5B), similarly contains allocated locations labeled U1-U3, C1-C7 and R1-R8 where the quadrature sensor current to voltage converters, peak detectors, and interface line drivers are to be placed. The current-to-voltage converters, peak detectors and interface line drivers alluded to above are discussed in U.S. Pat. No. 5,047,631 to Dale Frese, incorporated by reference above. All interconnections between boards and to the external interface are accomplished in the manner illustrated in FIG. 6.

First, all signals are routed on conductive traces (not shown but well known in the art) to plated-through holes 601 along one edge of each board, A and B.

Second, the boards A and B are placed back to back with spacers 602 to separate them and are held in this position, with their holes 601-1, 601-2, . . . , 601-n in alignment.

Third, a flat ribbon cable 603, composed of solid conductors 604 with the appropriate amount of insulation stripped from the end, is inserted into the holes 601-1, 601-2, . . . , 601-n of board B until the conductors 604 protrude from the holes 601-1, 601-2, . . . , 601-n in board A The ribbon cable 603 is then soldered in place on board A and B. Thus an intermediate assembly 620 is formed consisting of a sandwich of boards A and B held together by the conductors 604 of the ribbon cable 603 interconnecting them. The other end of the ribbon cable 603 distal to this intermediate assembly 620 terminates at a connector (not shown). The arrangement of signals on these holes 601 provides both boards A and B with power, provides signal paths for interconnecting signals between the two boards A and B, and provides an interface to external circuitry. Interconnecting signals may be prevented from passing to the external circuitry or to the next board by "notching" or cutting the conductors at appropriate locations in the cable between the printed circuit boards, or between external circuitry.

In this manner, signals and power may be routed to both printed circuit boards in a single assembly operation, resulting in savings in assembly labor cost. Furthermore, since no connectors are used to connect between the printed circuit boards, the size of the sensor assembly is further minimized and the cost of the assembly also reduced.

The final assembly consists of this intermediate assembly 260, the etched glass window 301, a housing 721 (preferably cast metal) with mounting holes 722, and a spring clip 723 and foam pad 724 for securing the ribbon cable 603 within the housing 721. The housing 721 includes a cavity 726 with openings on the top and bottom. The rim of the top opening features two steps 727 and 728 which circumnavigate the entire rim. The dimensions of these steps are such that the etched glass 301 will be supported and confined by the bottom step 728. The glass will protrude slightly above the top surface of the housing such that the first step 727 will form a channel around the perimeter of the glass 301. Epoxy cement is then poured into this channel to secure the glass 301 within the housing 721 and to seal out any liquid toner that may still be on the print medium 128. The intermediate assembly 620 of sensor boards is then inserted into the bottom opening of the cavity 726 until the sensors OP1-OP6 on the component side of the 'A' printed circuit board come into contact with the inner surface of the etched glass window 301. A set screw 729 in the side of the housing is then tightened forcing the top sensor board (A) against the opposite side 740 of the housing, thus securing the board A in this position. The ribbon cable 603 is folded against the bottom of intermediate assembly 620. A foam pad 724 is inserted, and a spring clip 723 is added to secure the ribbon cable 603 in this position and to provide strain relief.

To align the sensors OP1-OP6 mounted on board A with the etched glass 301 within the housing, an alignment method was used consisting of holes 732 and 733 on 'A' sensor board and cylindrical protrusions 730 and 731 in the corners of the inner cavity 726 on the side opposite the retaining set screw 729. During the fabrication of the sensor boards A and B, two holes 732 and 733 are drilled into the printed circuit board material. At the same time, the holes in which the pins of sensors OP1-OP6 are to be inserted are the precisely drilled with respect to these holes. The placement of the holes for the sensor pins with respect to the locations of holes 732 and 733 can be very accurately controlled, since they may be drilled by the same machine that drills holes 732 and 733. The location of the centers of holes 732 and 733 are at two neighboring corners of board A, such that when fabrication is completed, the boards are cut out of the printed circuit board material with the remainder of the holes 732 and 733 (quarter-circles) at the corners. The locations of these holes 732 and 733 matches the locations of the protrusions 730 and 731 within the housing 721 such that when the set screw 729 is tightened the board A is forced into alignment with the housing 721. The alignment of sensors OP1-OP6 with respect to their windows 701 and 115 is much more economically obtained under this method than by machining of the circuit board and individually aligning with the sensor housing 700, as previously practiced.

Furthermore, this feature allows a large number of small boards to be fabricated in quantity out of a large single board. Thus, the components such as the sensors OP1-OP6 may be mounted and soldered before breaking the individual boards apart without the use of a high precision cutting device. Since the holes 732 and 733 drilled into board A during fabrication provide accurate positioning of board A within the housing 721, the edges of board A and B do not have to be precisely machined. Therefore boards A and B are made less costly to manufacture. Also this allows the boards A and B to be "panelized" (i.e. making a large number of boards A or B on one piece of printed circuit board material, and breaking them apart along weakened lines scribed during the fabrication process), thereby further reducing their cost by allowing automated assembly techniques.

The features and advantages of the embodiments described herein are meant to be exemplary and not limiting.

I claim:

1. A method for sensing a printed object having an axis using sensors each having an illuminating portion and a light detecting portion, comprising the steps of:
   positioning a first sensor such that said illuminating portion of said first sensor is placed to provide illumination along said axis of said printed object;
   positioning a second sensor such that said light detecting portion of said second sensor and said light detecting portion of said first sensor are on opposite sides of said illuminating portion of said first sensor, so that the illumination by said illuminating portion of said first sensor provides reflections of said printed object to roughly identical intensities and angles of reflections at said light detecting portions of said first and second sensors; and
   preventing the illuminating portion of said second sensor from illuminating said printed object.

2. A method as in claim 1, wherein said preventing step comprises the step of providing a structure to block the illumination of said second sensor.

3. A method as in claim 1, wherein said preventing step comprises the step of inactivating the illuminating portion of said second sensor.

4. A structure for sensing a printed object having an axis, said structure comprising:
   a first sensor having an illumination portion and a light detecting portion, said first sensor positioned such that said illuminating portion provides illumination along said axis of said printed object;
   a second sensor also having an illumination portion and a light detecting portion, said light detecting portion of said second sensor positioned adjacent said illuminating portion of said first sensor and an opposite side of said illuminating portion of said first sensor as said detecting portion of said first sensor, such that illumination by said illuminating portion of said first sensor provides reflections of said printed object of roughly identical intensities and angles of reflection at said light detecting portions of said first and second sensors; and
   means for preventing the illuminating portion of the second sensor from illuminating said printed object.

5. A structure as in claim 4, wherein said means for preventing comprises structure for blocking the illumination of said second sensor.

6. A structure as in claim 4, wherein said means for preventing comprises means for inactivating the illuminating portion of said second sensor.

* * * * *